United States Patent [19]

Evans et al.

[11] 4,426,999

[45] Jan. 24, 1984

[54] SOLAR ENERGY COLLECTOR

[75] Inventors: Joseph H. Evans, Tempe; Jeffrey J. Hatman, Scottsdale; William E. Clark, Mesa, all of Ariz.

[73] Assignee: Ramada Energy Systems, Inc., Tempe, Ariz.

[21] Appl. No.: 350,290

[22] Filed: Feb. 18, 1982

[51] Int. Cl.³ ................................................ F24J 3/02
[52] U.S. Cl. ....................................... 126/450; 126/445
[58] Field of Search ............... 126/450, 445, 901, 444, 126/432

[56] References Cited

U.S. PATENT DOCUMENTS

| 3,671,286 | 6/1972 | Fischell | 126/901 |
| 4,212,291 | 7/1980 | Erb | 126/450 |
| 4,257,398 | 3/1981 | Watson | 126/445 |
| 4,353,356 | 10/1982 | Vandenbossche | 126/444 |

FOREIGN PATENT DOCUMENTS 2000860  1/1979  United Kingdom ............... 126/450

Primary Examiner—Samuel Scott
Assistant Examiner—G. Anderson
Attorney, Agent, or Firm—Spensley, Horn, Jubas & Lubitz

[57] ABSTRACT

A high performance, lightweight solar collector is disclosed. The collector consists of an upper glazing, a central fluid panel and a lower layer of insulating material. A fluid manifold is joined to each end of the panel and directs a fluid into and out of the panel. The glazing, panel and insulating layer are joined together and held in position by an attaching assembly and rail members.

14 Claims, 5 Drawing Figures

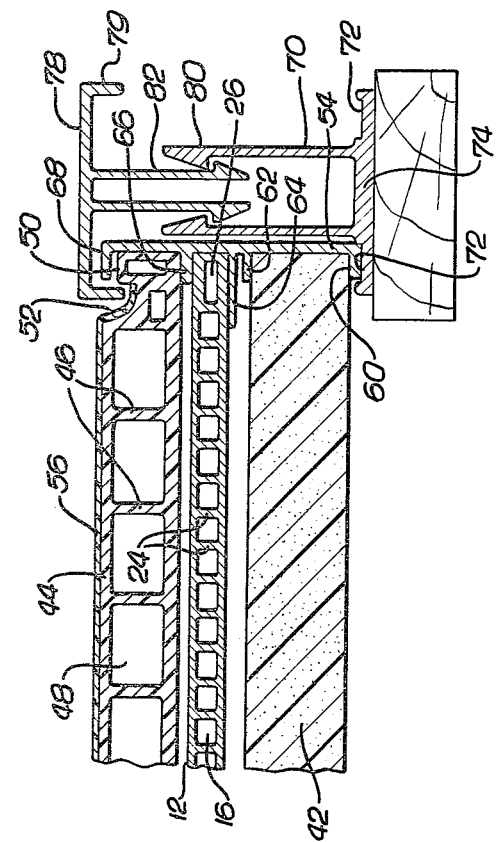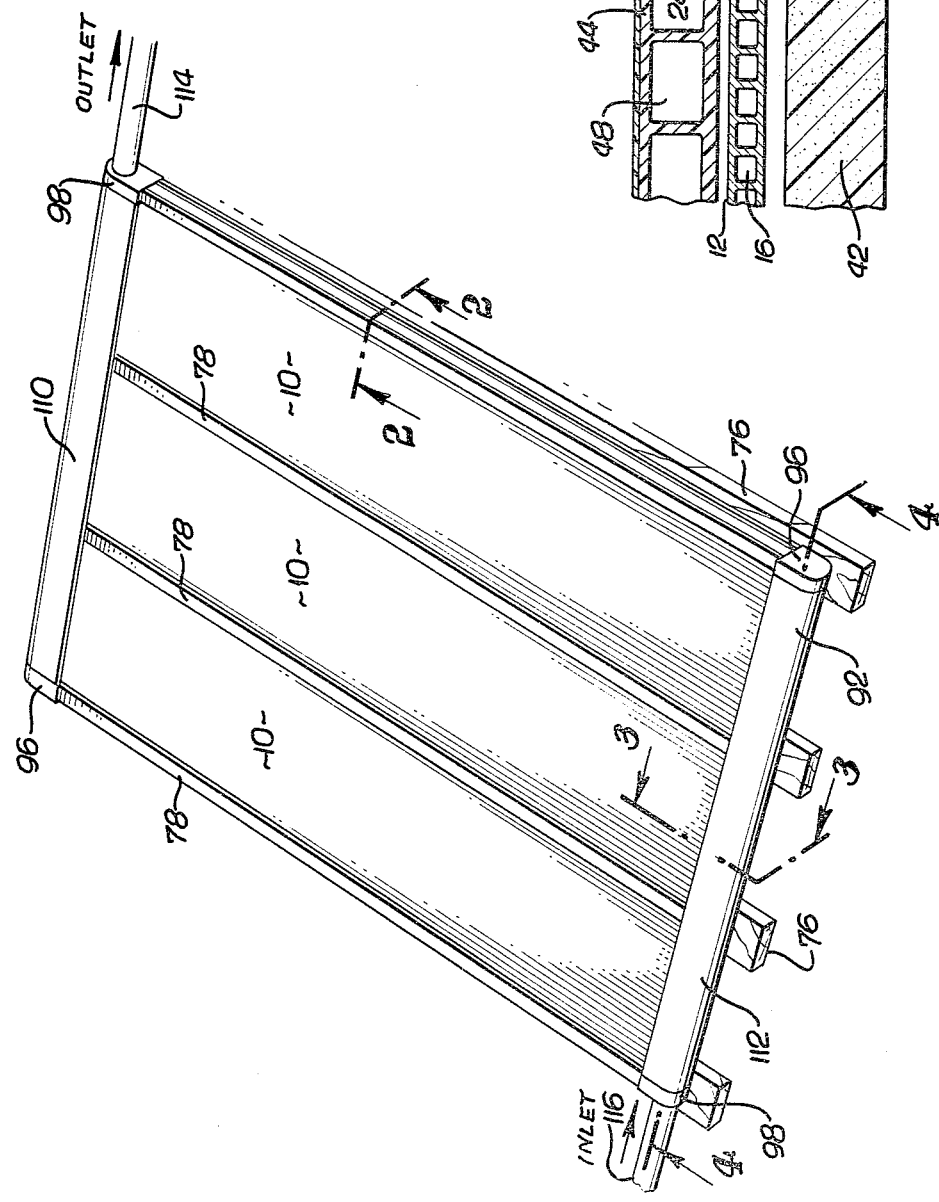

SOLAR ENERGY COLLECTOR

BACKGROUND OF THE INVENTION

1. Field of the Invention

This invention relates to a solar energy collector and, more particularly, to a lightweight, low cost solar energy collector.

2. Prior Art

There has long existed the need for a high performance, low cost solar collector. Solar collectors have generally been made using high cost materials including copper, stainless steel, aluminum, and tempered glass. The use of such materials has contributed to additional costs during processing as necessitated by the required configuration. Further costs are added on due to the weight incurred by such solar collectors in transportation, labor, and equipment used for installation, and in some cases structural reinforcements needed for existing installation sites.

Such metal prior art solar collectors consist of an absorber member, a means for transferring the absorbed energy to a fluid, usually water, a transparent cover or glazing, and an insulated frame which acts as a support for the absorber and glazing. The principle application of these devices is to heat water for domestic, industrial or commercial needs.

In recent years many solar collectors have been disclosed in patent literature which teach using one or more synthetic polymer materials. These patents suggest a plurality of solar collectors for an apparent variety of uses. However, because of the type of polymers used or because of the design, or both, such collectors are limited to low temperature application. Thus, in order to achieve higher temperature, many still continue to use collectors made from metal.

Representative examples of solar collectors which are made in whole or in part of polymeric materials are shown in U.S. Pat. Nos. 4,239,035; 4,221,210; 4,096,861; 3,934,323; 4,114,596; and 3,991,742. Referring specifically to the U.S. Pat. No. 4,221,210, there is disclosed a solar collector made from a synthetic material in which a liquid containing carbon particles is circulated. The reflective surface consists of a layer of aluminum or other metallic material placed outside the rear panel. Such a design effects a low to moderate absorption temperature. Absorbtivity is increased with the black fluid which simultaneously removes the heat. This patent also teaches that the solar panel can be made from polycarbonates, acrylics or glass.

Polycarbonates usually have a UL rating for continuous operating temperatures of less than 240° F., which is the upper limit for practical use. Commercialization of such a collector would thus require that absorber stagnation temperatures not exceed 239° F., which limits the collector design to that of low temperature and low efficiency. Furthermore, polycarbonates are subject to hydrolysis in hot water which limits their usefulness, and certainly, their life expectancies. Acrylics have a maximum UL rating for continuous operating temperature of only 200° F. Glass is impractical for solar collectors because of breakage. Moreover, a multi-channel panel made from glass presents immense processing problems. Other similar teachings are disclosed in U.S. Pat. Nos. 4,239,035 and 4,096,861.

Other problems are associated with such solar collector systems. For example, particles, pigments, and dyes added to the fluid tend to plate out on the panel surface resulting in a diminishing level of light passing through to the fluid. Fluid additives can also precipitate in the system causing clogging and flow restrictions. The fluid can also become non-uniform, thereby adversely affecting performance.

U.S. Pat. No. 3,934,323 discloses a non-glazed multi-channel solar panel made from polyethylene-fitted hollow headers wherein a fluid is pumped through exchanging heat with the environment. Such a configuration limits the system to low temperature applications such as providing heat for swimming pools. U.S. Pat. No. 3,991,742 is similar and is also limited to low temperature applications. U.S. Pat. No. 4,114,596 discloses a unitary solar collector made from polycarbonate or acrylics. As pointed out previously, these materials are temperature limited.

Thus, there still exists a need for a low cost solar collector capable of high thermal performance which can be mass produced using existing, readily available, lightweight materials.

The present invention has solved these and other problems by a unique design and the use of light weight plastic components. The present invention contemplates a configuration which allows forgiveness for lack of certain properties in the plastics used thereby permitting the use of various thermoplastics in the solar collector to fulfill a specific function. The overall result is a low cost, high thermal performing, light weight unit which lends itself to mass production.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

SUMMARY OF THE INVENTION

The present invention is directed to a uniquely designed, low cost solar energy collector which is made using known polymeric materials. Such utilization of polymers in the collector, in combination with the design, greatly reduces its weight as compared with collectors made from metal. The solar collector consists of a multichannel fluid absorber panel for transporting a liquid which is heated by thermal energy generated from the sun. Manifold tubes are attached to the opposite ends of the fluid panel to provide an inlet and outlet for the passage of fluid. A transparent glazing which allows penetration of light is affixed directly above the panel. The panel rests on an insulating layer, and the entire collector is encompassed by edge supports on either side. Thus constructed, the solar collector of the present invention can achieve stagnation temperatures in excess of 300° F. while maintaining minimal heat loss through its top surface.

DESCRIPTION OF THE DRAWINGS

FIG. 1 is a perspective view of the solar collector according to a preferred embodiment of the present invention.

FIG. 2 is a cross-sectional view taken along lines 2—2 of FIG. 1 and showing a partial side view section.

DESCRIPTION OF THE PREFERRED EMBODIMENT

Figure 5:
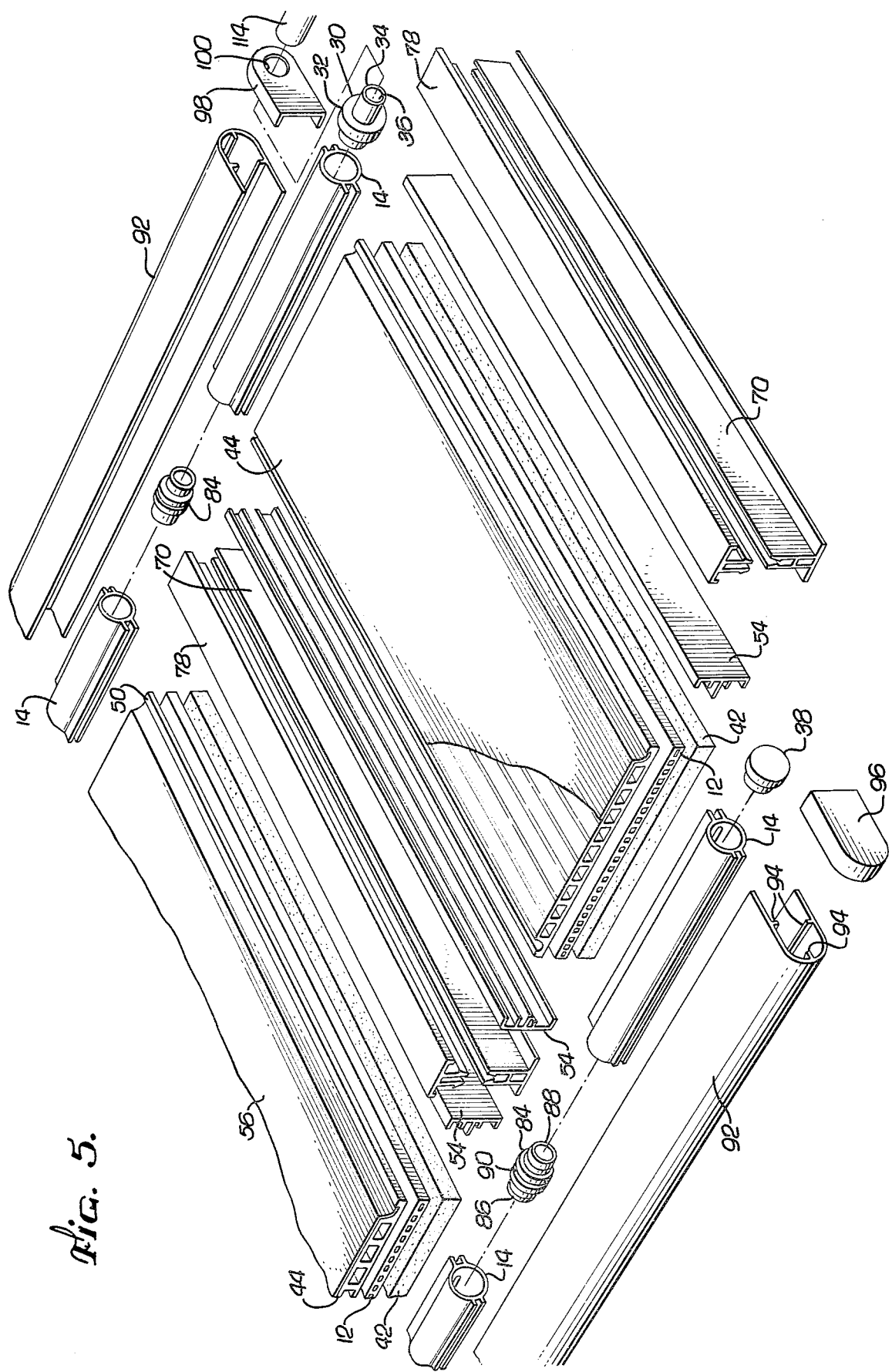
FIG. 5 is an exploded view of the solar collector of the present invention.

Referring to the drawings, there is seen in FIGS. 1 and 5 the major components of the solar collector 10 of the present invention. The collector 10 is comprised of a generally rectangular central fluid absorber panel 12, having hermatically sealed manifolds 14 joined at each end, thus providing a means for flowing fluid into and out of the panel 12. The fluid absorber panel 12 has multiple, rectangular channels 16 running lengthwise which direct the fluid from one end of the panel 12 to the other. Such a configuration for channels 16 maximizes the wetted surface available for good thermal performance.

Figure 3:
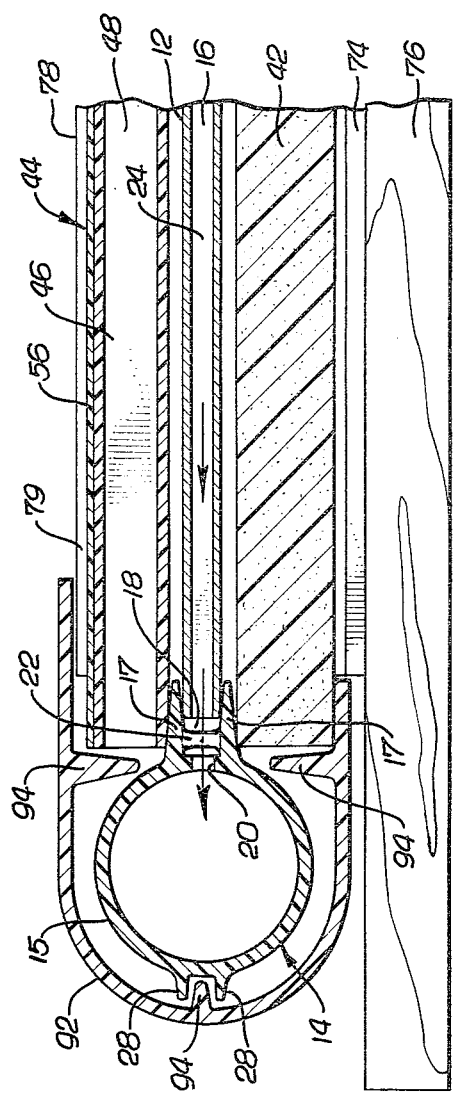
FIG. 3 is a cross-sectional view taken along lines 3—3 of FIG. 1 and showing a partial end view section.
Figure 4:
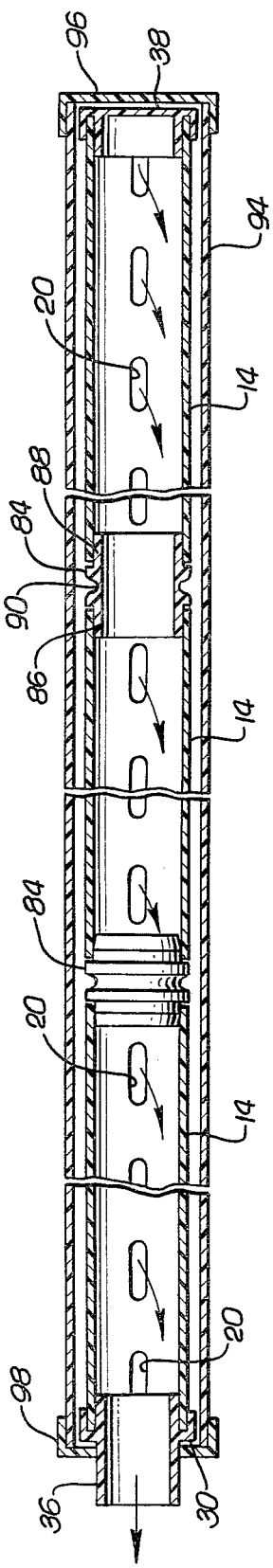
FIG. 4 is a cut-away view taken along lines 4—4 of FIG. 1 and showing a partial view of the manifold assembly.

The manifold 14 seen in FIGS. 3 and 4 consists of a rounded tube 15 having outwardly extending flanges 17 defining a plenum 18. Small orifices 20 are equally spaced along the length of the manifold 14 and define inlets and outlet for fluid flow. A deflector 22 is affixed directly in front of each orifice 20 to divert fluid exiting the main body of the manifold 14 into the plenum 18 at approximately a 90° angle. Such diversion of liquid results in more even flow distribution through each of the channels 16 in the fluid panel 12.

It is important that both the fluid panel 12 and manifold 14 be made from either the same type of material or from materials which are compatible with respect to thermal expansion and bonding ability. Also important is the ability of the materials to withstand stagnation temperatures, be resistant to hot water, and have and maintain good physical strength in tensile and impact properties. One material which meets these requirements is polysulfone. Such resin is made black by the addition of fine carbon particles to provide high absorbtivity and low reflectance. Alternately, these parts can be blackened by coating such as with an alkylated coating, paint, and or ink. Other resins which have the properties outlined above are also within the scope of this invention.

The fluid panel 12 is preferably extruded, and then cut to proper length. The fluid cell or channels 16 are rounded at the corners to withstand stress generated by pressure from the flow of fluids. The cell walls 24 (FIG. 2) formed by extrusion provide the desired configuration. Outside channels 26 are formed along the sides of panel 12, and have a generally elongated cross-section. The cell walls which form channels 26 are much thicker than walls 24 to better withstand external stress caused during assembly as hereinbelow described.

Manifold tubes 14 are also made by injection molding and are bonded to the fluid panel 12 using well known thermal welding techniques.

Referring again to FIG. 3, one can see that a pair of ridges 28 run along the manifold 14 directly opposite the plenum 18. The ridges 28 give the manifold 14 symmetry to resist bowing and bending which can result from unequal stress. Such stress, for example, arises from unequal thermal conditions during the welding process and during period of elevated temperatures such as stagnation. The ridges 28 also serve as a convenient part to be used to provide exact alignment during processing.

The manifolds 14 adjacent the top 110 and the bottom 112 of collector 10 are joined together by end caps 30. End caps 30 (See FIGS. 1 and 5) are hermetically joined to the manifolds 14. Caps 30 consist of an enlarged portion 32 which fits over the manifold 14, and a nipple portion 34 which allows connection to inlet/exit liquid supply tubes 114, 116 respectively. Caps 30 define an opening 36 which allows the passage of a fluid.

End cap closures 38 are also hermatically joined to manifold tubes 14 in the same manner as cap 30. End cap closures 38 are used to seal the ends of manifolds 14 such that fluid enters adjacent the top 110, flows through the manifolds 14 and panels 12 and exits out the bottom 112. Although there is shown in FIG. 1 three collectors 10, any number could be joined together. The number of collectors in a single array is limited only by the area of the installation site, pumping capabilities and efficiency performance. The number of collectors in an array will be determined by each individual requirement.

The fluid panel 12 and manifold 14 rest atop an insulation layer 42, as seen in FIGS. 2, 3 and 5. Layer 42 can be a rigid board made from glass-filled polyisocyanurate which provides insulation to minimize heat loss from the bottom of the collector 10. Layer 42 also provides support for the other elements of the collector 10. The polyisocyanurate material is preferably enclosed on the top and bottom with an aluminum foil for protection.

Referring now to FIGS. 2 and 5, an upper transparent glazing 44 is shown as secured above the fluid absorber panel 12. Glazing 44 provides structural support while encouraging the "greenhouse" effect to take place on fluid flowing through panel 12. The glazing 44 consists of a double-walled clear unit having internal support members or ribs 46 placed perpendicular to the top and bottom surfaces which define channels 48. The transparent vertical ribs 46 give support to the glazing 44 while the open channels 48 trap air or other fluid which acts as insulation, thereby increasing the collector's thermal performance. As with the fluid panel 12, the glazing 44 is a single part formed by extrusion. A closer look at the glazing 44 in FIG. 2 illustrates that the outer edge portion 50 is lower than the main body of the glazing 44 and is separated by a depression 52. The outer edge portion 50 is so designed to enable an edge strip 54 to interlock with the glazing 44.

A one mil thick plastic film 56 is preferably bonded to the top surface of the glazing 44 and acts as a UV filter. An important aspect of the present invention is the ability to filter out UV radiation which would be harmful to the plastic parts. One such material particularly useful for the purpose of screening out UV radiation is polyvinyl flouride film coated with a UV absorbing adhesive. Polyvinyl flouride films sold under the name "TEDLAR" are produced by E. I. DuPont De Nemours and Company. The combination of the film 56 and adhesive filter out the UV below 350 nm and protects the glazing 44 and panel 12 while allowing the bulk of the useful light to pass through.

Glazing 44 is preferably manufactured from a suitable polymer possessing several desirable characteristics. Required characteristics for the glazing 44 include high transmissivity, the ability to be extruded, resistance to photo-degradation, good physical strength and rigidity, and good impact strength. One such thermoplastic material which meets desired needs for the glazzing 44 is UV stabilized polycarbonate.

Referring now to FIG. 5, one can see that individual collectors 10 are connected to the manifold 14 by flexible couplers 84 made from EPDM. Coupler 84 are formed of two joined and tapered sections 86, 88 and a depressed groove 90 is formed at the center for flexibility for possible offset movement of the adjoining collectors. Couplers 84 are affixed to manifold tubes 14 by inserting the manifold into the first or second sections 86, 88.

The primary elements of collector 10, the panel 12, insulation layer 42 and glazing 44 have now been described. The manner in which these elements are joined together will now be set forth.

Referring now to FIGS. 2 and 5 one can see how the elements previously mentioned are joined together. In the preferred embodiment these elements (panel 12, layers 42 and glazing 44) are positioned between edge strips 54. Edge strips 54 consist of an elongated rail having protrusions which allow for placement and securement. Each edge strip 54 is cut the same length as the three parts it supports and serves as the outside frame on both sides of the collector 10. Strip 54 has five protrusions extending along its length. The insulation layer 42 is supported on the lowest protrusion 60, while the fluid absorber panel 12 rests directly atop the insulation layer 42. Second and third protrusions 62 serve to retain the insulation layer 44 and the fluid absorber panel 12, and thus prevents layer 44 and/or panel 12 from lateral movement. The glazing 44 rests on top of protrusion 66 as to be separated from and above panel 12. Finally, the top protrusion 68 fits over the top of the glazing 44 to hold glazing 44 in place. The two upper protrusions 66, 68 form a spring-like fit with the edges 50 of glazing 44 and thereby effect a good mechanical joint.

Edge strips 54 can be conveniently extruded from a variety of suitable materials such as aluminum or black, UV resistance polycarbonate, and then cut to the desired length.

Assembled solar collectors 10 are mounted at the installation site to a base rail 70 as seen in FIG. 2. The base rail 70 consists of a longitudinal, aluminum structure having grooves 72 on a lower leg portion 74 so designed to hold strip 54 by protrusion 60. In a typical situation, base rail 70 is attached to the roof structure 76. Holes are drilled into the legs 74 of the base rail 70 and rail 70 is attached to the roof structure 76 using screws or the like. Once one of the base rails 70 is secured to the roof struture 76, the solar collector 10 is placed into the rail 70 at the groove 72. A second base rail 70 is then joined to the opposite side of the collector 10 and is positioned and secured to the roof support 76. Additional collectors are added to the array in the same manner.

Individual collectors 10 are secured together by placing a cap strip 78 between locking legs 80 located on the upper portion of the base rail 70. Referring to FIG. 2, there is seen details of the locking mechanism in the two rail parts. Legs 80 on the upper portion of the base rail 70 are made of a rigid material, preferably aluminum. Legs 82 on the cap strip 78 are inserted into the base rail 70 between legs 80. Once engaged, the cap strip 78 locks into place with the base rail 70, thereby providing a firm attachment. To further maintain the structural integrity of the various elements of the collector 10, strip 78 has outwardly extending arms 79 which are designed to retain strip 54, the panel 12, insulation layer 42 and glazing 44 in a desired position. Arms 79 are designed to fit into depression 52 formed in glazing 44. Disassembly is easily achieve by sliding the cap strip 78 out in either direction from the rail 70. The cap strip 78 is extruded from a suitable material that provides good mechanical strength with the required flexibility. UV protected polycarbonate can be used for cap strip 78.

Once a collector 10 is assembled, protective manifold covers 92 are placed over the ends. The purpose of the cover 92 is to prevent heat loss at the manifolds 14. The coverings 92 are made of UV stabilized polycarbonate which allows passage of light to aid in heating the collector at the manifolds. Protrusions 94 on the inside surface of the housing 92 serve to secure the manifold 14 in place.

Cover caps 96 and 98 are placed over the ends of the manifold cover 92 to keep out dust. Two types of cover caps are necessary, with the only difference being an opening 100, positioned on one type to accommodate the protruding nipple 34 at the inlet and exit positions of the collectors 10. Cover caps 96, 98 can be molded from EPDM or other suitable material.

According to a preferred embodiment of the present invention, a composite solar collector 10 capable of relatively high thermal performance is made using lightweight, heat resistant polymeric materials. The two major portions of the solar collector, the transparent window or glazing 44 and the fluid panel 12 are produced by extrusion and are cut to desired length for secondary operations. UV filter film 56 is laminated to the glazing 44. The fluid panel 12 is joined to previously molded manifold tubes 14 at either end to allow the passage of a liquid which is heated by solar radiation. One advantage of the present invention is the use of lightweight materials which are conveniently handled for ease of assembly. Yet another advantage of the invention is the use of relatively low cost materials. Another advantage of the invention is the ease of on-site installation because of the lightweight and configuration of the solar collector 10. Still another advantage of the present invention is the ability to cut and assemble the solar collector 10 to any convenient length.

Single solar collectors may be joined in a collector array by means of couplers 84. Collectors 10 cut to the same length are positioned and joined at the manifolds 14 using couplers 84 which are fitted to each manifold 14 as previously stated by attachment to both inside and outside surfaces of tube 15.

Thus assembled, the collector array is ready to receive water or other suitable fluid. In the preferred embodiment, water is passed through the collectors 10 at a constant rate using a suitable pump (not shown). The liquid supply inlet 116 is situated such that the liquid enters the collectors 10 through each succeeding manifold 14 adjacent the bottom 112. The fluid enters the plenum 18 through orifices 20 in the manifold 14 and is diverted by means of deflectors 22 to effect an even distribution through channels 16. The liquid flows through the tubular fluid absorber panel 12 at an even rate until it reaches the plenum 18 in the manifolds 14 at the upper end 110 of the collector 10. The water which is heated by solar radiation as it passes through the fluid absorber panel 12, enters the orifices 20 in the manifold 14 adjacent the upper end 110 and exits through the manifold 14 and through outlet 114. The heated fluid is then returned to a source for which heat is intended and/or heat is exchanged. If desired, the collector 10 could be operated such that fluid enters adjacent the top 110 and flows down toward the bottom 112.

Another important aspect of this invention is that the choice of materials is not severly limited. For example, the polymer used for the fluid panel absorber need not necessarily be resistant to UV because UV radiation is filtered out. Also, the polymer need not be restricted to having high structural strength because the construction using interlocking rails and structural design of the glazing provide mechanical strength. The material used for the glazing can be any clear, high strength polymer regardless of its UV resistance, again because UV radiation is blocked at the filter. The UV filter material is applied to the top surface of the glazing. A variety of materials and coating that have UV filtering, quenching or other blocking capabilities are applicable and are not limited on the basis strength because the unique design allows the glazing to provide the strength. This invention, therefore, is not to be limited to specifically what is shown and described.

We claim:

1. A solar collector comprising:
   (a) an upper glazing structure of clear plastic material having a first plurality of integral, open channels formed therein and extending along the length thereof, said glazing structure allowing the passage of solar radiation therethrough;
   (b) a central fluid panel providing a second plurality of integral, open channels formed therein and extending along the length thereof for fluid flow from one end thereof to the other, said fluid panel configured to absorb solar radiation and transfer it to said fluid;
   (c) a lower layer of insulating material forming a heat barrier;
   (d) manifold means for directing fluid into and out of said second plurality of channels in said fluid panel, said manifold means having an outwardly extending plenum joined to each said fluid panel adjacent said channels;
   (e) engaging means having a plurality of outwardly extending protrusions for engaging elements (a), (b) and (c) individually so as to secure said elements along the length thereof in a predetermined spaced configuration;
   (f) rail members joined to said engaging means for positioning and securing said solar collector to a support structure; and
   (g) elongated cap strips selectively joined to each said rail member, each said cap strip including an outwardly extending arm urging said engaging means against said rail members.

2. A solar collector according to claim 1 wherein the cross-sectional area of said channels in said upper glazing structure is larger than the cross-sectional area of said channels in said fluid panel.

3. A solar collector according to claim 1 further including a film of a UV protective material disposed on said upper glazing structure.

4. A solar collector according to claim 1 wherein said engaging means comprises a strip of material with said protrusions integrally joined thereto.

5. A solar collector according to claim 4 wherein each said rail member has an elongated groove and said strip is disposed in said groove.

6. A solar collector according to claim 1 wherein said insulating material is covered with a thin metal layer.

7. A solar collector according to claim 1 wherein a series of said solar collectors are joined together.

8. A solar collector according to claim 1 wherein said fluid panel is made of a substantially opaque plastic.

9. A solar collector according to claim 1 wherein said upper sheet and said fluid panel are made of an extruded thermoplastic material.

10. A solar collector according to claim 1 wherein said manifold means includes (i) a plurality of flow orifices, and (ii) means for deflecting the fluid as it flows out of said orifices, said means for deflecting joined to said plenum and extending across each said flow orifice.

11. A solar collector according to claim 10 wherein said deflecting means is disposed in said plenum.

12. A solar collector according to claim 1 further including a housing member disposed about said manifold means, said housing having means for aligning said manifold means.

13. A solar collector according to claim 1 wherein said cap strip has depending legs slidably disposed within each said rail member.

14. A solar collector according to claim 1 wherein said glazing structure defines a depressed region formed adjacent each said rail member, and said arm extends into said depressed region.

* * * * *